Patented Apr. 1, 1924.

1,488,480

UNITED STATES PATENT OFFICE.

THOMAS A. EDISON, OF WEST ORANGE, NEW JERSEY, ASSIGNOR TO EDISON STORAGE BATTERY COMPANY, OF WEST ORANGE, NEW JERSEY, A CORPORATION OF NEW JERSEY.

REGENERATION OF ALKALINE STORAGE-BATTERY ELEMENTS.

No Drawing. Application filed September 28, 1921. Serial No. 503,970.

*To all whom it may concern:*

Be it known that I, THOMAS A. EDISON, a citizen of the United States, and a resident of West Orange, in the county of Essex and State of New Jersey, have invented certain new and useful Improvements in Regeneration of Alkaline Storage-Battery Elements, of which the following is a description.

My invention relates to the regeneration of storage battery elements and more particularly to the regeneration of the positive electrode elements of storage batteries of the Edison type in which an alkaline electrolyte is employed, and in the preferred form of which the active material of the positive elements comprises hydroxides of nickel and the active material of the negative elements comprises electrolytically active iron or oxides of iron.

Edison storage battery cells, as usually constructed, comprise alternately arranged positive and negative plates separated and insulated from each other, all the positive plates being rigidly connected together and assembled in a single unit, and all the negative plates likewise being rigidly connected together and assembled in a single unit. Each of the positive and negative plates comprises a steel grid carrying a plurality of perforated pockets or tubes with the active material tightly packed therein. In the case of the positive plates, the perforated tubes contain alternate layers of hydroxides of nickel as the active material, and metallic nickel flake, the layers of nickel flake merely serving as conductors between the adjacent layers of the active material. In new cells, prior to the first charging, this active material consists of nickel hydroxide in the lowest or first stage of oxidation, that is, in the nickelous state. Upon charging such cells this nickelous hydroxide first goes to another and higher stage of oxidation and finally to a still higher stage of oxidation, being then in the form of hydrated peroxides of nickel, or in what may be termed the nickelic state. On discharging the cells, however, the active material of the positive elements never returns to the lowest or first stage of oxidation or to the nickelous state, but is merely reduced from a higher to a lower hydroxide. The active material of the positive elements of an Edison cell is the depolarizing material, and when such a cell is charged the active material of the negative elements is changed to metallic iron, while upon discharge of the cell this iron is oxidized. When an Edison cell has been in operation for a very long period, however, it is often found that the active material of the positive electrode elements will no longer act as an efficient depolarizer for the active material of the negative electrode elements. This condition is due in a large measure to the fact that impurities and foreign matter gradually accumulate on and in the positive elements, and eventually the tubes carrying the active material, and also the active material and the layers of metallic flake nickel disposed between the layers of such active material, become coated with a scale or crust which seriously impairs the efficient operation of the cell. In this connection, it may be noted that when the layers of metallic flake nickel become thus coated, they will no longer act as efficient conductors between the superposed layers of the nickel hydrate. The loss of efficiency, thus caused, is especially pronounced in the case of cells not properly cared for, as where distilled water has not been used in replenishing the electrolyte. Moreover, in the continued use of an Edison cell a small amount of the electrolytically active iron and iron-oxide of the negative electrode elements is gradually dissolved by the electrolyte and slowly deposited from the electrolyte on and in the positive elements, which also results in impairing the efficiency of the cell.

The principal object of my invention is to regenerate the positive electrode elements of Edison storage battery cells so as to thoroughly clean the same and bring them to their original state and efficiency.

I have found that the foregoing object may be attained by subjecting the positive elements of Edison storage battery cells to the action of a strong acid to remove the coating on the exterior surface portions, then to the action of a reducing agent and preferably to an alkaline solution of such a reducing agent, and finally subjecting such elements in a proper manner to the action of a weak solution of an alkali.

In treating the positive electrode elements with the alkaline solution of a reducing agent, the same are immersed in the solution and the latter maintained at the boiling point until the whole of the active material of the elements is in the form of nickel hydroxide in the first oxidation stage, that is, in the nickelous state. During this treatment a great deal of the impurities and other foreign matter, such as any iron and iron-oxide which may be present, is also removed from the elements. Various reducing agents may be employed, such as glucose or any sugar, but I have found glycerine to be the most practical and efficient material, and that the best results are obtained by employing an approximately 10% solution of glycerine in water containing approximately 1% of an alkali such, for example, as caustic soda. In regenerating the positive elements, the entire positive element assembly is immersed in this solution, and in most cases I find it necessary to keep such assembly in the solution, which is constantly maintained at the boiling point, for a period of approximately three days in order to completely reduce the active material and restore it to its original or nickelous state. This treatment also removes impurities and foreign matter from the elements. The positive element assembly is then removed from the reducing solution and, as stated above, subjected to the action of a weak solution of an alkali, preferably a solution of approximately 1/10 of 1% of an alkali, such as caustic soda. The assembly is kept in this solution, which is constantly maintained at the boiling point, until all the reducing agent and any remaining foreign matter and impurities, are completely removed from the electrode elements, and in most cases I find it necessary to continue this step of my process for a period of approximately three days. The assembled positive electrode elements upon being then removed from the weak alkaline solution, are again ready for use in storage battery cells.

In order to obtain the best results the assembled positive electrode elements should be properly treated, prior to subjecting the same to the action of the alkaline solution of glycerine or other reducing agent, so as to remove therefrom impurities and foreign matter including iron and iron-oxide, which may have been deposited on the exterior surfaces by the electrolyte. This may be done in various ways but preferably is accomplished by immersing the positive element assembly in a 30% solution of hydrochloric acid and leaving the same therein for a period of about five minutes.

When I first started my experiments on the present process I opened the tubes of the positive electrode elements, removed the active material and metallic flake nickel, scrapped the tubes, separated the nickel flake from the active material, and then regenerated the latter and the metallic nickel flake and used the same for loading new tubes in making new positive electrode elements. Further experiments made, showed that the desired regeneration could be effected by subjecting an entire tube containing the active material and nickel flake to the process herein described, and finally that this result could be obtained by treating either an entire positive plate with the tubes carried thereby or the entire positive electrode element assembly in accordance with such process. This was important in that it showed it to be unnecessary to disassemble the positive electrode element assembly, or to take apart the positive plates or the tubes carried thereby.

Many attempts have heretofore been made by me to regenerate the positive elements of storage batteries of the Edison type, but while these attempts resulted in the improvement of such elements, the latter were not regenerated to their original state. This was due mainly to the fact that the elements were not subjected either to the action of the solution of the reducing agent, or to the action of the weak alkaline solution, for a sufficient period of time. In other words, heretofore the element of time was not sufficiently appreciated by me.

While I have described the preferred manner of carrying out my improved process, it is to be understood that the same is subject to various changes and modifications without departure from the spirit of the invention and the scope of the appended claims.

1. The process of regenerating a positive element of a storage battery cell of the Edison type, which consists in subjecting said element, in which the active material consists of nickel hydroxides, to the action of a solution of a reducing agent until such active material is reduced to nickel hydroxide in the first oxidation stage, then subjecting said element to the action of a weak alkaline solution, substantially as described.

2. The process of regenerating a positive element of a storage battery cell of the Edison type, which consists in subjecting said element, in which the active material consists of nickel hydroxides, to the action of a solution of a reducing agent and an alkali until such active material is reduced to nickel hydroxide in the first oxidation state, then subjecting said element to the action of a weak alkaline solution, substantially as described.

3. The process of regenerating a positive element of a storage battery cell of the Edison type, which consists in subjecting said element, in which the active material consists of nickel hydroxides, to the action of an approximately 10% solution of glycerine until such active material is reduced to nickel hydroxide in the first oxidation stage, then subjecting said element to the action of a weak alkaline solution, substantially as described.

4. The process of regenerating a positive element of a storage battery cell of the Edison type, which consists in subjecting said element, in which the active material consists of nickel hydroxides, to the action of an approximately 10% solution of glycerine in water containing approximately 1% of an alkali, until such active material is reduced to nickel hydroxide in the first oxidation stage, then subjecting said element to the action of a weak alkaline solution, substantially as described.

5. The process of regenerating a positive element of a storage battery cell of the Edison type, which consists in subjecting said element, in which the active material consists of nickel hydroxides, to the action of a solution of a reducing agent, until such active material is reduced to nickel hydroxide in the first oxidation stage, then subjecting said element to the action of a solution of approximately one-tenth of 1% of an alkali, substantially as described.

6. The process of regenerating a positive element of a storage battery cell of the Edison type, which consists in subjecting said element, in which the active material consists of nickel hydroxides, to the action of a solution of a reducing agent for a period of approximately three days, then subjecting said element to the action of a weak alkaline solution, substantially as described.

7. The process of regenerating a positive element of a storage battery cell of the Edison type, which consists in subjecting said element, in which the active material consists of nickel hydroxides, to the action of a solution of a reducing agent until such active material is reduced to nickel hydroxide in the first oxidation stage, then subjecting said element to the action of a weak alkaline solution for a period of approximately three days, substantially as described.

8. The process of regenerating a positive element of a storage battery cell of the Edison type, which consists in treating such element, in which the active material consists of nickel hydroxides, so as to remove impurities and foreign matter including iron and iron oxide therefrom, then subjecting the element to the action of a solution of a reducing agent until such active material is reduced to nickel hydroxide in the first oxidation stage, then subjecting said element to the action of a weak alkaline solution, substantially as described.

9. The process of regenerating a positive element of a storage battery cell of the Edison type, which consists in subjecting said element, in which the active material consists of nickel hydroxides, to the action of a boiling solution of a reducing agent until such active material is reduced to nickel hydroxide in the first oxidation stage, then subjecting said element to the action of a weak alkaline solution, substantially as described.

10. The process of regenerating a positive element of a storage battery cell of the Edison type, which consists in subjecting said element, in which the active material consists of nickel hydroxides, to the action of a solution of a reducing agent until such active material is reduced to nickel hydroxide in the first oxidation stage, then subjecting said element to the action of a weak alkaline solution maintained at the boiling point, substantially as described.

11. The process of regenerating the positive electrode elements of a storage battery cell of the Edison type, which consists in treating the entire positive electrode element assembly of such cell so as to remove impurities and foreign matter including iron and iron oxide therefrom, subjecting such entire assembly to the action of an approximately 10% solution of glycerine in water containing approximately 1% of an alkali, maintained at the boiling point, for a period of approximately three days, and then subjecting said entire assembly to the action of a weak alkaline solution, maintained at the boiling point, for a period of approximately three days, substantially as described.

12. The process of regenerating a positive element of a storage battery cell of the Edison type, which consists in subjecting said element, in which the active material consists of nickel hydroxides, to the action of an acid solution, then to the action of a solution of a reducing agent, and finally to the action of a weak alkaline solution, substantially as described.

13. The process of regenerating a positive element of a storage battery cell of the Edison type, which consists in subjecting said element, in which the active material consists of nickel hydroxides, to the action of an approximately 30% solution of hydrochloric acid, then to the action of a solution of a reducing agent, and finally to the action of a weak alkaline solution, substantially as described.

14. The process of regenerating a positive element of a storage battery cell of the Edison type, which consists in subjecting said element in which the active material consists of nickel hydroxides, to the action of a strong acid solution until most of the impurities and foreign matter, such as iron and iron-oxide, is removed from the exterior surface portions of the element, then subjecting said element to the action of a solution of a reducing agent until said active material is reduced to nickel hydroxide in the first oxidation stage, and finally subjecting said element to the action of a weak alkaline solution until all remaining impurities and foreign matter are removed, substantially as described.

This specification signed this 26th day of September, 1921.

THOS. A. EDISON.